W. E. MARX.
CHANGE SPEED GEAR.
APPLICATION FILED MAY 27, 1921.
1,399,139.
Patented Dec. 6, 1921.
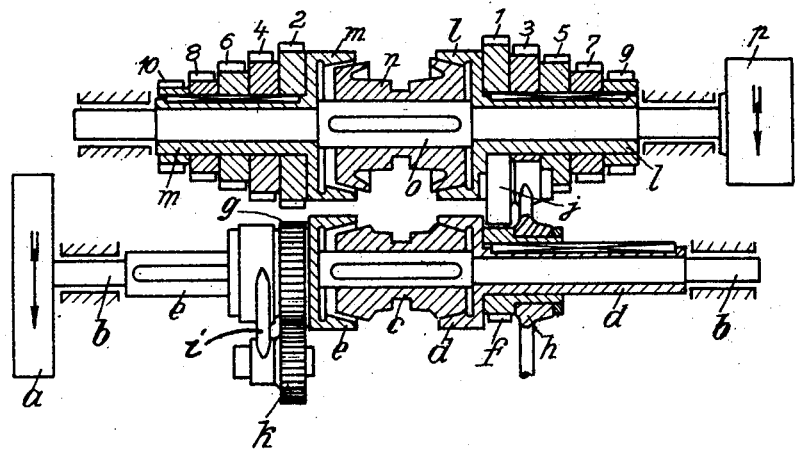
Inventor:
Wilhelm Edward Marx
By: Herbert G. Ry
Attorney.

UNITED STATES PATENT OFFICE.

WILHELM EDUARD MARX, OF BERLIN-SPANDAU, GERMANY.

CHANGE-SPEED GEAR.

1,399,139.  Specification of Letters Patent.  Patented Dec. 6, 1921.

Application filed May 27, 1921. Serial No. 473,040.

*To all whom it may concern:*

Be it known that I, WILHELM EDUARD MARX, a citizen of the German Republic, and a resident of Berlin-Spandau, Germany, have invented certain new and useful Improvements in Change-Speed Gears, for which I have filed an application in Germany on May 22, 1920, and of which the following is a specification.

Change-speed gears for varying rotary speed have been employed already in connection with machine-tools, motor-cars, and the like. There are two main groups of such gears, namely, I, such in which only the power-transmitting wheel pairs mesh with each other;

II, such in which all wheels, the power-transmitting wheels, as well as the idly running wheels, are in mesh with each other.

Concerning the gears of the first group the variation of the speed is effected by causing the wheel pairs concerned to mesh with each other either by radial adjustment, for instance with the aid of a Norton link-motion, or by axial adjustment, for instance with the aid of displaceable wheels, the change from one speed to another being possible only while the gear is at a stand-still, or, in the most favorable case, during the time, that the machine or motor, etc., is running light.

Concerning the gears of the second group, each wheel pair has a friction clutch or a dog clutch or a spring clutch which allows of changing the speed at any time. These gears require the greatest number of wheels, and their efficiency is low because all wheels must constantly be in mesh with each other.

The change-speed gears of the first group are far more used than those of the second group owing to their simple construction and their higher efficiency in comparison to the gears of the second group; they are employed as simple intermediate gearing or counter-shaft gear, also as built-in gears. The gears of the second group allow, it is true, of an immediate variation of the speed, which is a considerable advantage in comparison to the gears of the first group, but the latter are very much cheaper and their reliability of service is greater.

In the present invention the simple construction of the change-speed gears of the first group is combined with the advantages of the change-speed gears of the second group, and the invention consists in forming of two gears of the second group one gear of the first, the arrangement being such that the halves of the novel combination gear alternately transmit the rotary motion in stepped speed variations, and in this operation the one half of the novel gear stands still and allows of changing the wheel pairs, whereas the other half transmits the rotary motion, the effect being that the speed may be varied at any time and under any load and that only those gears mesh with each other which transmit the power.

In order to make my invention more clear, I refer to the accompanying drawing which shows a longitudinal section through a change speed gear constructed according to this invention.

The pulley $a$ is firmly attached to the shaft $b$ by feather and groove. The shaft $b$ has attached to it, also by feather and groove, a displaceable double friction cone $c$, which may be coupled on the one side with the hollow cone $d$ and on the other side with the hollow cone $e$. These cones are loosely rotatable upon the shaft $b$ and their sleeve-like hubs carry cog-wheels $f$ and $g$ which rotate together with said cones, but may be axially displaced upon said hubs. The hubs of the cog wheels $f$, $g$ extend for some length upon the hubs of the hollow cones $d$, $e$, and coupled to them are levers $h$ and $i$, of which the lever $h$ carries a cog-wheel $j$ and the lever $i$ carries a cog-wheel $k$. These cog-wheels $j$ and $k$ are supported by bolts affixed to said levers, and these latter are freely rotatable upon the hubs of the cog-wheels $f$ and $g$. The wheel $j$ may be caused to mesh with any one of cog-wheels 1, 3, 5, 7, 9 and the wheel $k$ may be caused to mesh with any one of cog-wheels 2, 4, 6, 8, 10, in either case by displacing the cog-wheel $f$ or $g$ respectively, upon the respective cone-hub. The wheels 1, 3, 5, 7, 9 are supported by the suitably elongated sleeve-like hub of a hollow cone $l$, and the wheels 2, 4, 6, 8, 10 are supported by the suitably elongated sleeve-like hub of a hollow cone $m$. All these wheels are connected by feather and groove with the respective hubs. Between the hollow cones $l$ and $m$ is a double cone $n$ which, although also connected with its shaft $o$ by feather and groove, may be axially displaced upon it. A pulley $p$ is firmly affixed to the shaft $o$.

The manner of operation is as follows:

Supposing, the pulley $a$ of the shaft $b$ be turned then also this shaft and the cone $c$ rotate. If, as in the drawing, the cone $c$ has been shifted so as to be coupled with the cone $d$, then also this latter and the cogwheel $f$ are rotated. The rotation is transmitted to the cog-wheel $l$ because the wheel $j$ is just meshing with the wheel $l$. To change the ratio of the transmission, the wheel $j$ is thrown out of gear from the wheel $l$ by suitably turning the lever $h$, and this lever is moved to the right for a certain length of way so as to adjust the wheel $j$ opposite to any of the wheels 3, 5, 7, 9, depending upon the other ratio demanded. The lever $h$ is turned in the direction to the set of wheels in question whereby the wheel $j$ is made to mesh with the opposite wheel, as desired. As long as the cone $n$ is not coupled with the cone $l$, the wheels 1, 3, 5, 7, 9, rotate idly, but as soon as the coupling between $o$ and $l$ is established, the rotation of said wheels is transmitted to the shaft $o$ and the pulley $p$ the speed of the rotation depending upon the transmission wheel chosen (1 or 3 or 5 or 7 or 9). The transmission wheels upon the other side of the gearing (2, 4, 6, 8, 10) do not partake in the rotation, because the cone $m$ is not coupled with the cone $n$.

If the ratio of speed is to be varied, the cog-wheels $g$ and $k$ are suitably shifted to the left so as to bring them into the plane of that of the cog-wheels 4, 6, 8, 10 (provided, another speed than that produced by the cog-wheel 2 is desired), which produces the speed demanded. Throwing the cog-wheel $k$ out of gear from any of the cog-wheels 2, 4, 6, 8, 10 and throwing it into gear with any of them may be most easily effected because the wheels upon the left side of the gearing are not rotated during that time and as also the cone $e$ is not in engagement with the cone $c$. The respective wheels having changed their positions, the cones $c$ and $n$ are shifted to the left when the rotation of the shaft $e$ will be transmitted to the shaft $o$ with the other speed required. The cog-wheels $f$ and $j$, as well as 1, 3, 5, 7, 9, cease rotating as soon as the cones have changed their positions.

It is obvious that any one of the wheels 1, 3, 5, 7, 9 may be thrown out of gear from, and into gear with, the wheel $j$ while the shaft $o$ is rotated by the mediation of any one of the wheels 2, 4, 6, 8, 10, and that any one of these latter wheels may be thrown out of gear from, and into gear with, the wheel $k$ while the shaft $o$ is rotated by the mediation of any one of the wheels 1, 3, 5, 7, 9. The changes of speed may be effected in steps corresponding to the succession of the decreasing or increasing diameter of the wheels of the two sets, or any one of the various ratios possible may be established by means of the wheels producing just that special ratio. The change may always be effected during the operation of the respective machine tool or motor car, even when running with full load.

Having thus particularly described the nature of my invention, what I claim as new and desire to secure by Letters Patent of the United States is:

A combination change-speed gear, comprising, in combination two change speed gears arranged side by side and comprising each a set of co-axial stepped cog-wheels, a pair of axially displaceable cog-wheels arranged outside of said set, and meshing with each other, means to rotate one of these latter wheels, the other of them being adapted to transmit the rotary motion to any of the wheels of the said set; two parallel shafts, one carrying the two sets of wheels and the other the rotated wheels of the two pairs; hollow cones connected with these rotated wheels; a shiftable double cone arranged between them upon the respective shaft; hollow cones connected with said set of wheels; a shiftable double cone arranged between them upon the respective shaft; and means to shift any one of the double-cones.

In testimony whereof I affix my signature in presence of two witnesses.

WILHELM EDUARD MARX.

Witnesses:
GEORGES MEILING,
T. HUNTER.